(No Model.)

W. B. GIBSON.
SEED PLANTER.

No. 323,413. Patented Aug. 4, 1885.

WITNESSES
O. F. Nottingham
Geo. F. Downing

INVENTOR
William B. Gibson
By H. A. Seymour,
Attorney

UNITED STATES PATENT OFFICE.

WILLIAM B. GIBSON, OF SMITHVILLE, ASSIGNOR OF ONE-HALF TO O. N. GEISE, OF TERRELL COUNTY, GEORGIA.

SEED-PLANTER.

SPECIFICATION forming part of Letters Patent No. 323,413, dated August 4, 1885.

Application filed June 5, 1885. (No model.)

*To all whom it may concern:*

Be it known that I, WILLIAM B. GIBSON, of Smithville, in the county of Lee and State of Georgia, have invented certain new and useful Improvements in Cotton-Seed Planters; and I do hereby declare the following to be a full, clear, and exact description of the invention, such as will enable others skilled in the art to which it appertains to make and use the same.

My invention relates to an improvement in cotton-seed planters, the object of the same being to provide a dropper which may be applied with slight expense to a great majority of the machines now in use, and which will more effectually equalize the number of seeds deposited in each hill than those hitherto constructed, and which will use the entire amount of seed from the hopper.

With these ends in view my invention consists in certain features of construction and combinations of parts, as will be hereinafter described, and pointed out in the claims.

Figure 1:
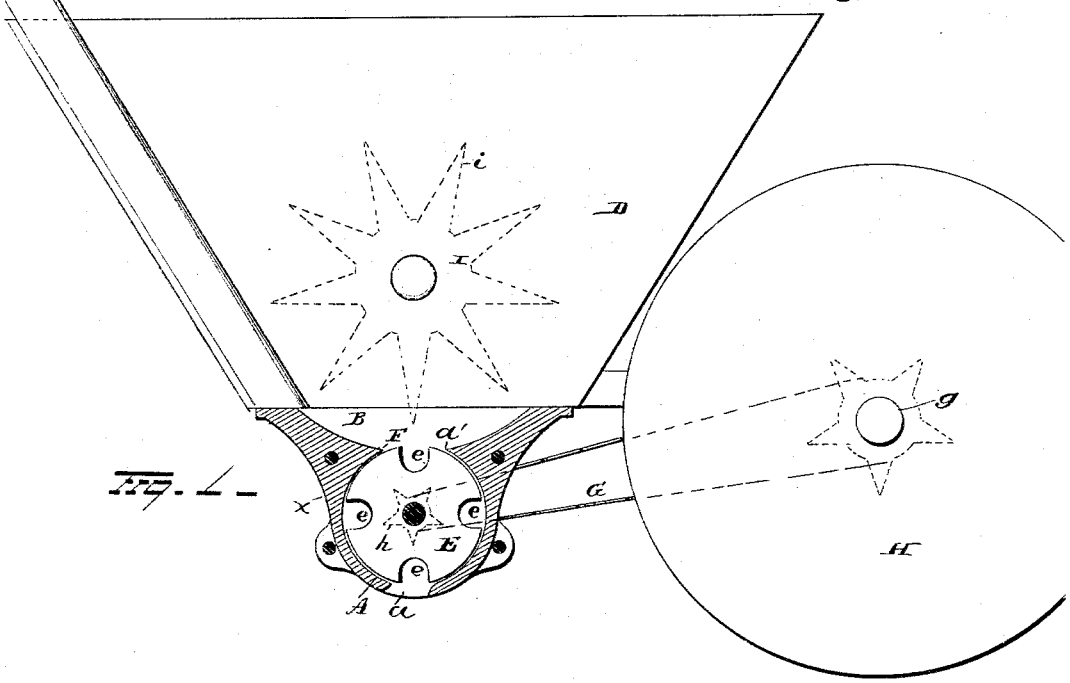
Figure 2:
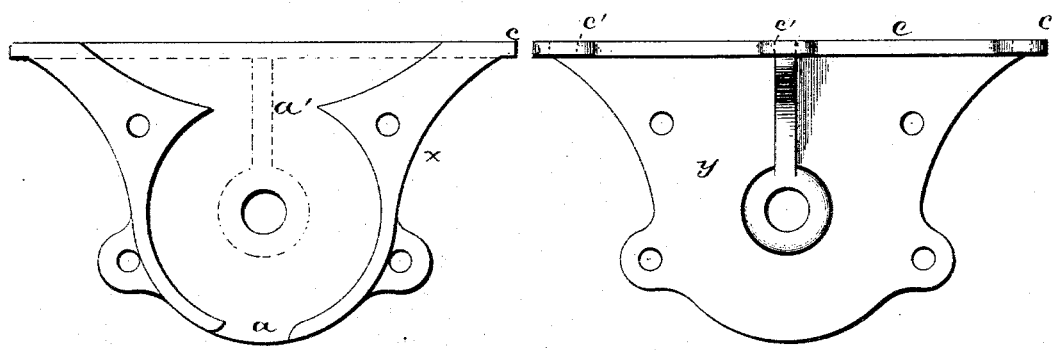

In the accompanying drawings, Figure 1 is a view of the dropping-pocket in vertical section in position on a planter, and Fig. 2 is a detached view of the pocket with its sections separated.

A represents a cylindrical pocket provided with an opening, $a$, at the bottom and an opening, $a'$, at the top. The opening $a'$ communicates with the bottom of a funnel-shaped recess, B, formed in the upper portion of the frame C, which supports the cylindrical casing of the pocket A. The said recess B is adapted to form a continuation of an ordinary hopper, D, its expanded end opening directly into the hopper. The portion of the frame C about the recess B consists of a flat plate, $c$, adapted to form the bottom of a hopper, and is provided about its edges with bolt-holes $c'$, for convenience in securing the frame to the hopper.

A dropping-wheel, E, is journaled within the cylindrical pocket A, and fits as snugly therein as is consistent with a free rotary motion. The wheel E is provided on its face with one or more seed-pockets, $e$, preferably four, located at such distances apart as to furnish the desired spaces between the hills. The seed-pockets $e$ are U-shaped, and each is calculated to hold the exact number of seeds which it is desired to plant in a single hill.

The edges F of the dropping-pocket casing, which are located at the ends of the opening $a'$, are sharp, and the ends of the recess B are preferably curved as shown, for the purpose of leveling the seed which fills the pockets. The edges F tend to slide the seeds which lie above the face of the dropping-wheel gradually off therefrom, which process has hitherto been found objectionable on account of the crowding of the seeds into the pocket or the removal of too many seeds therefrom, due to the blunt and improper shape of the striking-edge.

The wheel E is preferably rotated by means of a sprocket-band, G, connecting a sprocket-wheel, $g$, on the axle of the supporting-wheel H with a sprocket-pinion, $h$, on the shaft of the wheel E.

A wheel, I, provided with a series of wings or prongs, $i$, is journaled within the hopper, to keep the seed agitated and cause it to feed regularly to the seed-pockets in the dropping-wheel.

The opening $a$ is located slightly to the rear of the bottom point of the dropping-pocket, and is sufficiently large to allow the entire amount of seed to escape from the seed-pocket without striking the rear edge of the opening $a$. The front edge of the said opening is beveled, as shown, to allow the seed to start from the pocket just before the pocket reaches the full opening. The seed from the pocket will thus be caused to move in a bunch directly into the hill prepared for its reception.

The frame C is preferably cast in two sections, $x$ and $y$, the section $x$ forming one side and the curved surface of the casing, and having one section of the plate $c$ cast integral therewith, the section $y$ forming the opposite side of the dropping-pocket, and having the other section of the plate $c$ formed integral therewith. The two sections $x$ and $y$ may be bolted or otherwise secured together after the wheel E has been placed in position therein.

The simplicity of the above construction and the convenience with which it is applied to machines now in use, taken in connection with its effectiveness in dropping the required number of seeds in the required spot and its freedom from clogging or jamming the seed, render the device of great value to the planter.

I am aware that it is old to provide a dropping-wheel with seed-pockets, and locate the same partially below the hopper in a position within a casing such that the upper portion of the wheel shall enter the hopper to a greater or lesser extent, and therefore I do not claim the same, broadly.

It is evident that slight changes might be resorted to in the construction of the above-described parts without departing from the spirit and scope of my invention; hence I do not wish to limit myself strictly to the construction herein set forth; but, Having fully described my invention, what I claim as new, and desire to secure by Letters Patent, is—

1. In a cotton-seed planter, the combination, with a hopper, of a casing located directly below and forming the bottom of the hopper, and provided with a tapering or funnel-shaped recess or cavity, and a wheel-pocket located below and communicating with said funnel-shaped recess or cavity, and a dropping-wheel located within said pocket.

2. In a cotton-seed planter, the combination, with a hopper, of a casing located below and forming the bottom of said hopper, and provided at a point below the hopper with two sharp lips or edges lying transversely to the plane of rotation of the dropping-wheel, and the dropping-wheel located within the casing below said lines or edges, substantially as set forth.

In testimony whereof I have signed this specification in the presence of two subscribing witnesses.

WILLIAM B. GIBSON.

Witnesses:
J. F. JOHNSON,
T. S. BURTON.